United States Patent Office 3,339,864
Patented Sept. 5, 1967

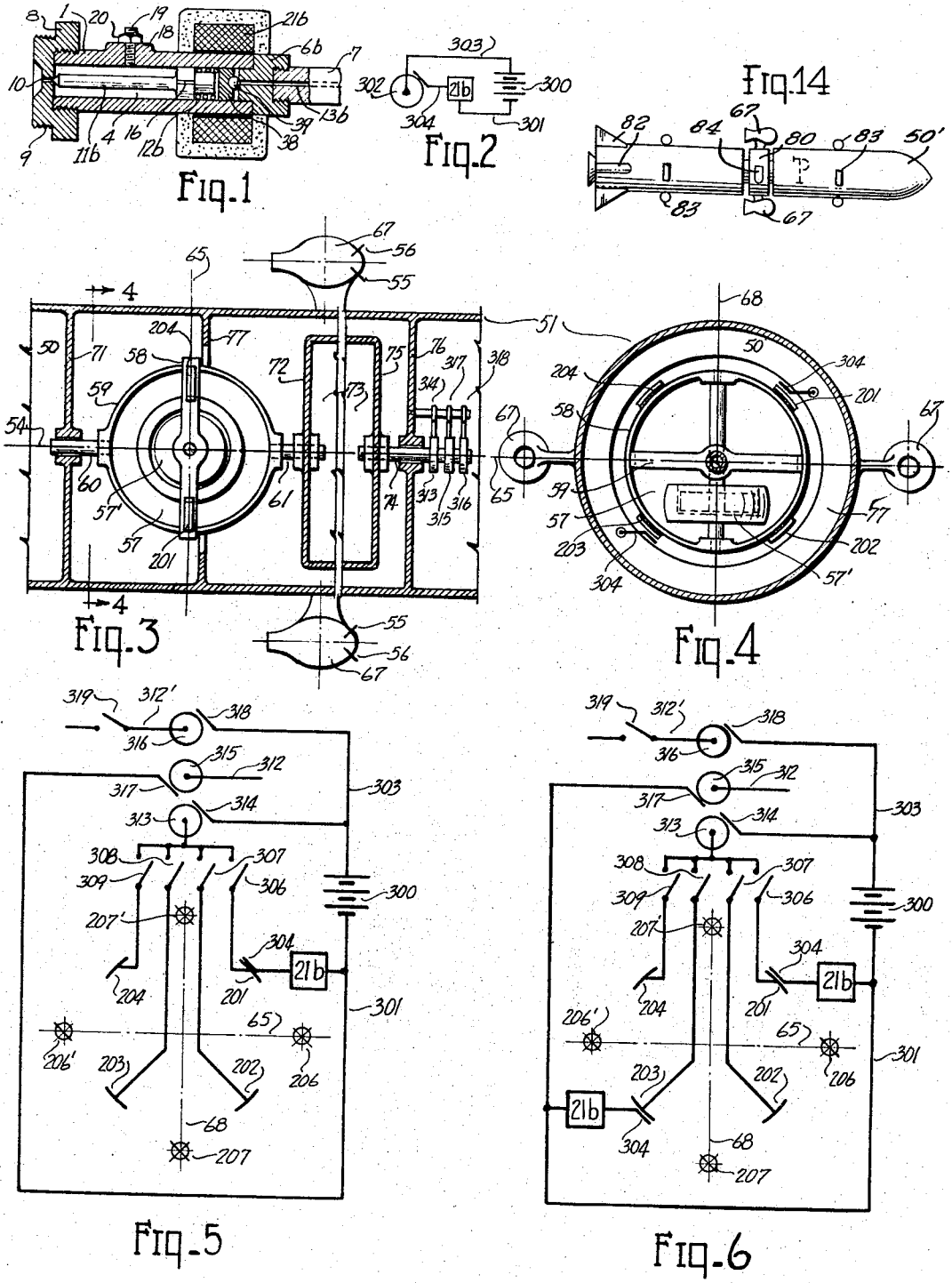

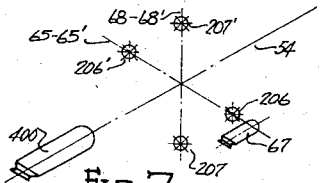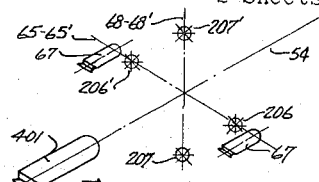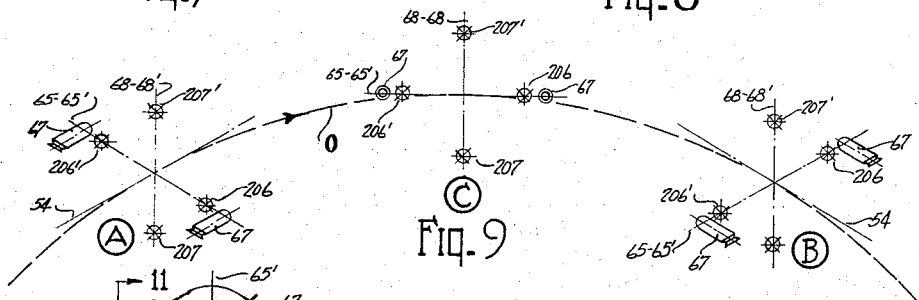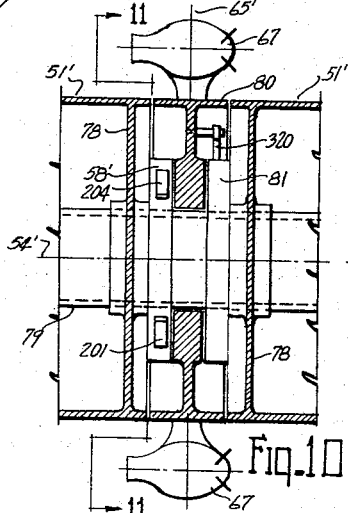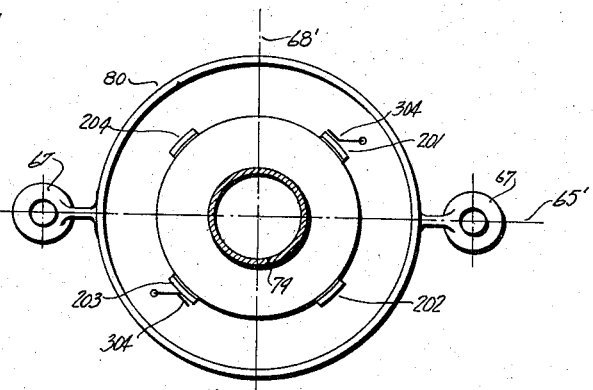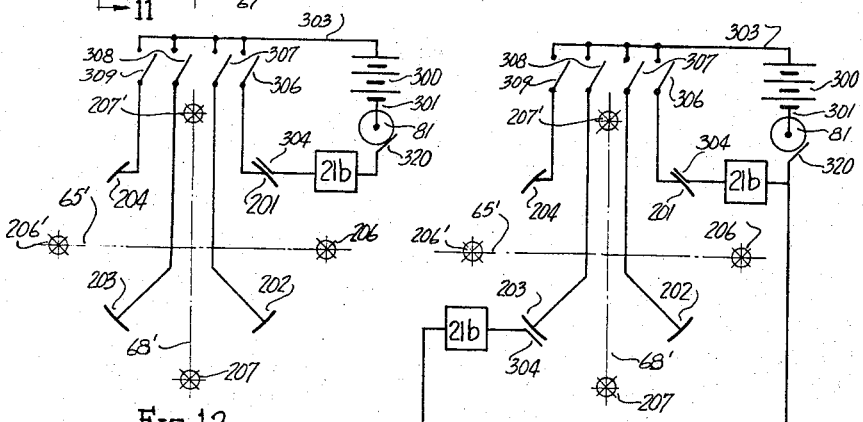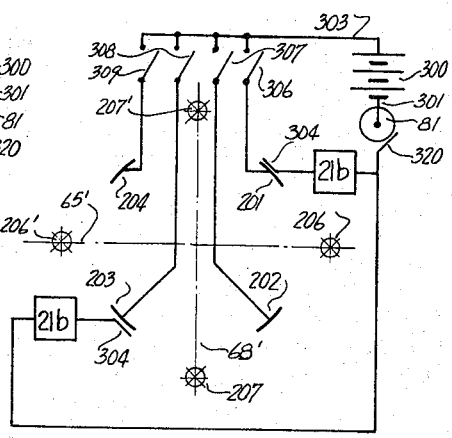

3,339,864
METHOD AND APPARATUS FOR GUIDING AND PROPELLING SPACE VEHICLES IN BOTH ATMOSPHERIC AND PLANETARY FLIGHT
John W. Whitson, New York, N.Y., assignor of one-half to Clare H. Whitson, New York, N.Y.
Filed Mar. 1, 1965, Ser. No. 436,142
27 Claims. (Cl. 244—1)

My invention relates to improvements in method and apparatus for guiding and propelling space vehicles in both atmospheric and planetary flight and is a continuation-in-part of my application Ser. No. 253,785, filed Mar. 4, 1963 which was a continuation-in-part of my applications Ser. No. 50,129, filed Aug. 17, 1960, and Ser. No. 770,984, filed Oct. 31, 1958.

Prior type apparatus for spin stabilized space vehicles such as missiles, rockets and projectiles has been limited to correcting deviations of a vehicle from a prescribed heading, as caused by atmospheric disturbances, and to changing a vehicle's course to home it in on an evasive target.

Prior apparatus for correcting deviation from a prescribed heading has comprised radio transmission on a vehicle's pitch and yaw (if it occurs from atmospheric disturbances) to a ground station for processing, and the return of a signal to the vehicle designed to fire a laterally directed thrust element, rotating with the vehicle, and positioned to overcome the pitch or yaw and bring the vehicle into a new heading approximately parallel to the prescribed heading. Obviously such apparatus could not function in space as the atmospheric disturbances necessary to start it functioning would not be present hence the vehicle could not pitch or yaw and the required signal could not be sent to the ground station, also pitch and yaw could not be caused by "drift" as the vehicle is spin stabilized. An example of such apparatus will be found in Schlesman which is listed in my citation of prior art.

Prior apparatus designed to direct a spin stabilized vehicle's course to an evasive target has comprised equipping the vehicle to receive a signal emanating from the target and then processing the signal to operate thrust elements, rotating with the vehicle, and designed to align the vehicle's flight axis with the target. An example of such apparatus will be found in Linscott et al. which is listed in my citation of prior art.

Optical scanning systems have been used to direct projectiles to their targets by controlling lateral thrust elements designed to align the thrust axis of the projectile with a moving target. An example of such apparatus will be found in Haigney which is listed in my citation of prior art.

Prior type apparatus for fin stabilized (non-rotating) space vehicles such as missiles and rockets has also been limited to the correction of course deviations from a vehicle's prescribed heading, as caused by atmospheric disturbances. Apparatus of this type has the spin axis of a gyroscope aligned with the prescribed flight axis of the vehicle so that when the vehicle pitches or yaws, from its prescribed heading, the displacement of the flight axis from that of the gyroscope will cause laterally, or rearwardly, directed thrust elements to function and bring the vehicle into a new heading approximately parallel to the prescribed one. In space this apparatus would serve to correct pitch or yaw as caused by "drift" and maintain the flight axis of the vehicle aligned with and tangent to the vehicle's orbit but the apparatus would not serve to orient the vehicle in any other attitude. An example of this type of apparatus can be found in Edwards et al. which is listed in my citation of prior art.

The operation of any of the above cited apparatuses is compatible with the laws of aerodynamics and they will all serve to steer their vehicles in the atmosphere but these apparatuses will not serve to guide their vehicles in space where guidance comprises orienting the thrust axis of a vehicle in an attitude so that an applied thrust force will cause a change in the shape of the vehicle's orbit by increasing or decreasing the vehicle's speed or when the thrust axis is oriented at an angle to the vehicle's orbital plane the thrust force will serve to change the orbital plane. These maneuvers are illustrated in my FIG. 9.

The primary object of my invention is to provide method and apparatus for the guidance and propulsion of both rotating and non-rotating space vehicles with thrust elements positioned and controlled in a manner both compatible with the laws of aerodynamics when a vehicle is in atmospheric flight and with the laws of planetary flight when the vehicle is in orbit. I do this by providing a common operating method for two types of apparatus which are carried in the vehicle for the selective control of thrust elements which are rotated about the thrust axis of the vehicle. One type of apparatus has its thrust elements rotated with a spin stabilized vehicle and the other type has its thrust elements rotated independently of a non-rotating vehicle. The apparatuses selectively control the thrust elements to thrust, or not to thrust, when they are substantially aligned with the horizon or with a plane coincident with the vehicle's thrust axis and perpendicular to the horizon. Thus a vehicle can be steered in atmospheric flight and oriented when in orbit with the same thrust elements and the same control apparatus, and the same apparatuses can control a set of thrust elements to steer and orient the vehicle as described and also propel and control the propulsion of the vehicle in both atmospheric and space environments.

A further object of my invention is to provide that the control apparatus can be manually operated by a human pilot riding in the vehicle, or by electronic means as part of an inertial guidance system, or by an auto-pilot in the vehicle, or by servo-mechanisms, or by radio signal from ground.

With the above mentioned and other objects in view, the invention consists in the novel construction and combination of parts hereinafter described, illustrated in the accompanying drawings, and set forth in the claims appended hereto, it being understood that various changes in form, proportion, size, location and details of construction within the scope of the claims may be resorted to without departing from the spirit or sacrificing any of the advantages of the invention.

Referring to the drawings:

FIG. 1 is a sectional view through a fuel injector and is substantially a copy of FIG. 7 of my U.S. Patent 2,798,769.

FIG. 2 is a wiring diagram illustrating the electrical control system for the injector illustrated in FIG. 1 and is substantially a copy of FIG. 8 of Patent 2,798,769.

FIG. 3 is a sectional plan view of a portion of a space vehicle.

FIG. 4 is a vertical sectional view taken on line 4—4 of FIG. 3.

FIG. 5 is a wiring diagram illustrating an electrical control system for a single fluid fuel rocket motor for guidance and orientation of the space vehicle illustrated in FIGS. 3, 4.

FIG. 6 is a wiring diagram illustrating an electrical control system for two fluid fuel rocket motors for propulsion, guidance and orientation of the space vehicle illustrated in FIGS. 3, 4.

FIG. 7 is a diagram illustrating a space vehicle guided and oriented by a single motor as diagramed in FIGS. 5, 12.

FIG. 8 is a diagram illustrating a space vehicle propelled, guided and oriented by two motors as diagramed in FIGS. 6, 13.

FIG. 9 is a diagram illustrating the vehicle of FIG. 8 at three positions in orbit.

FIG. 10 is a sectional plan view of a portion of a space vehicle.

FIG. 11 is a vertical sectional view taken on line 11—11 of FIG. 10.

FIG. 12 is a wiring diagram illustrating an electrical control system for a single fluid fuel rocket motor for guidance and orientation of the space vehicle illustrated in FIGS. 10, 11.

FIG. 13 is a wiring diagram illustrating an electrical control system for two fluid fuel rocket motors for propulsion, guidance and orientation of the space vehicle illustrated in FIGS. 10, 11.

FIG. 14 is a plan view of a non-rotating space vehicle illustrating features of FIGS. 10, 11.

In detail the construction illustrated in the drawings comprises: the injector, as illustrated in FIG. 1, with an outer casing 1 composed of a non-magnetic material; a fuel chamber 4 is closed at one end by a cap 8 which is threaded to receive the casing 1 and threaded as at 9 for screwing into an opening leading into a combustion space in which liquid or gaseous fuel is burned; cap 8 has an orifice 10 in which needle valve 11b is seated by spring 12b; the fuel chamber 4 is closed at its other end by the plug 6b which is made of magnetically attractive material and has an opening 13b therethrough connecting to fuel line 7; needle valve 11b has grooves 16 formed in its enlarged portion to allow for the free flow of fuel into the chamber 4; a boss 18 on the casing 1 has a tapped hole to receive the volume adjusting screw 19 which is provided with a lock nut 20. The enlarged portion of the needle valve 11b serves as a movable core for the solenoid coil 21b, check valve 38 also serves as part of the movable core; the check valve contains ball 39 which seats in the opening 13b to seal the chamber 4 against entry of fuel from the fuel line 7 when coil 21b is energized; coil 21b is encased in magnetically attractive material.

FIG. 2 illustrates a source of power 300, connected to the solenoid coil 21b by wire 301 and to the timer 302 by wire 303; the timer is connected to coil 21b by wire 304.

*Operation*

As taught by Patent 2,798,769 the phenomenon of the "compressibility of fluids" is utilized to cause injection.

With fuel chamber 4 containing fuel under pressure, received from fuel line 7, then when the timer 302 cycles to energize the coil 21b, check valve 38 will be attracted by plug 6b and seal off the fuel in chamber 4 from the fuel supply in fuel line 7; needle valve 11b will be attracted against the check valve 38 to unseat the needle valve and permit the compressed fuel in chamber 4 to discharge through the orifice 10; when coil 21b is deenergized the spring 12b will seat the needle valve, check valve 38 will be released so that fuel can enter chamber 4 from the fuel line 7 and thus complete the injection cycle. The pressure of spring 12b against the needle valve tends to delay its unseating until after the check valve has sealed the opening 13b. The volume of fuel discharged from chamber 4 is throttled by varying the pressure on the fuel in line 7. Any of the injectors illustrated in Patent 2,798,769 can be used to demonstrate my guidance methods; the injector illustrated in FIGS. 1, 2 was chosen because of its operating simplicity.

In FIGS. 3, 4; 50 represents a section of a spin stabilized space vehicle; mounted on its outer wall 51 are two liquid fuel rocket motors 67 which are rotatable with the vehicle about its thrust, flight, rotational and longitudinal axis 54 and they serve to propel, steer and orient the vehicle in both atmospheric and planetary flight. Each motor has a fuel injector 55 (similar to the injector illustrated in FIG. 1) for the injection of a suitable charge of mono-fuel and an igniter 56 for igniting the fuel.

A gyroscope control unit 57 has an electrically driven gyroscope rotor 57' held in frames 58, 59 which are secured together at substantially a right-angle to each other; as illustrated in FIG. 3 the lead line from 57' embraces the basic elements of a gyroscope rotor, the two outer circles representing its rotating element and the inner circle its stationary coil elements, also illustrated in dotted lines in FIG. 4. Frame 59 supports shafts 60, 61 which are concentric with axis 54. Shaft 60 is journaled in anti-friction bearings in bulkhead 71 which is secured to the outer wall 51 and shaft 61 is secured to the end wall 72 of the pilot and instrument compartment 73. Shaft 74 is also concentric with axis 54, is secured to the end wall 75 of compartment 73 and is journaled in anti-friction bearings in the bulkhead 76 which is secured to the outer wall 51. When required shaft 60 can be journaled in an electric motor mounted in the bulkhead 71, the motor when energized serving to supply a counter torque on shaft 60 to balance the frictional drag on the shafts 60, 74 due to the rotation of the vehicle about axis 54. Shafts 60, 61, 74 are tubular and, as required, any of them can be provided with slip rings, similar to those illustrated on shaft 74, so that wiring connections can be made between rotating and stationary elements of the vehicle.

With the rotor 57' spinning, the axis 65 of the control unit will be maintained substantially aligned with the horizon and the axis 68 will be maintained substantially aligned in a plane coincident with the thrust axis 54 and perpendicular to the horizon and the control unit will remain substantially stationary relative to the rotating vehicle. The plane just described would also be the flight plane of the vehicle in atmospheric flight and the orbital plane of the vehicle when in the attitudes illustrated at positions A and B of FIG. 9; position C of FIG. 9 illustrates the axis 68 as aligned with a plane coincident with the thrust axis 54 and perpendicular to the horizon.

In a gravitational environment, a weight positioned at the bottom of the control unit can be substituted for the rotor or the rotor can be positioned as illustrated in FIG. 4 to maintain the control unit stationary as described. The pilot and equipment contained in compartment 73 can be positioned to achieve this same purpose as well as to overcome the frictional drag on shafts 60, 74.

Movably secured to frame 58 are contacts 201–204 which, as illustrated in FIGS. 4, 5, 6, make contact with the brushes 304 connected to the injector solenoid coils 21b which are connected to the wire 301 leading to the source of electrical power 300. The brushes 304 are mounted on the bulkhead 77 and rotate with it; the bulkhead is secured to outer wall 51; the contacts 201–204 are connected through switches 306–309 to slip ring 313, which is mounted on shaft 74, and through brush 314 to wire 303 leading to the source of power 300. The motor of the gyroscope rotor 57' is connected by wires 312, 312' to slip rings 315, 316 mounted on shaft 74. Ring 315 is connected to wire 301 through brush 317 and ring 316 is connected to wire 303 through brush 318. A switch 319 controls the motor of the gyroscope rotor. Switches 306–309, 319 are located in compartment 73, for manual operation by a human pilot, or by an auto-pilot, or by servomechanisms, or they can be components of any type of electronic control system wherein their functioning would be commanded by inertial or ground directed electronic equipment.

The guidance motors are diagramed as operated with single injectors but, when required for fuels composed of separately injected components, a plurality of injectors can be employed. Additional injectors, controlled by conventional means, can be employed to maintain a steady thrust from the motors with the elements herein disclosed used to vary the magnitude of the thrust; the variation in magnitude of thrust being an addition to, or a diminution of, the normal motor thrust.

The wiring diagrams in FIGS. 5, 12 are substantially copies of FIG. 2; the contacts 201–204 and their associated elements serving for the timer 302 to control a single rocket motor 67.

The vehicle can be rotated with jets or inclined vanes as illustrated in FIG. 14 at 82, 83 or the motors 67 can be inclined so that their rearward thrust will serve to rotate the vehicle; when several motors are employed only some of them need be inclined. The vehicle's environment and mission will determine the means to be employed for rotation; inclined vanes in the atmosphere and jets and inclined motors in all environments.

A space vehicle in atmospheric flight requires a greater thrust from its motors than when in orbit therefore with the injectors illustrated in Patent 2,798,769 a maximum thrust can be obtained by using liquid fuel when the vehicle is in atmospheric flight and a minimum thrust can be obtained by using gaseous fuel or pressurized gas when it is in orbit.

Operation

FIG. 5 illustrates an electrical control system for selectively controlling a single rocket motor 67 for the guidance and orientation of the space vehicle illustrated in FIGS. 3, 4, 7.

With the vehicle propelled in atmospheric flight through a separate propulsion system, as diagramed in FIG. 7, and rotating clockwise about axis 54 and with rotor 57' spinning and with switches 306–309 in a normally open position; then when switch 306 is closed the motor 67 will fire substantially in alignment with position 206 on the axis 65 of the control unit 57 and the thrust of the motor will move the nose of the vehicle to the left of its flight plane; when switch 308 is closed the motor will fire substantially in alignment with position 206' on the axis 65 and the thrust of the motor will move the nose of the vehicle to the right of its flight plane; when either switch 307 or 309 is closed the motor thrust will occur substantially in alignment with positions 207, 207' respectively on the axis 68 of the control unit 57 and substantially aligned with the vehicle's flight plane and the motor thrust at substantially these positions will move the nose of the vehicle above or below its course in the flight plane accordingly. The operations described will also serve to orient the vehicle when it is in orbit.

FIG. 6 illustrates an electrical control system for selectively controlling two motors 67 to guide, orient and propel the space vehicle illustrated in FIGS. 3, 4, 8.

With the vehicle rotating clockwise about axis 54 and in atmospheric flight and with switches 306–309 in normally closed positions so the motors 67 will each fire when substantially in alignment with positions 206, 207, 206', 207' on the axes 65, 68 of the control unit 57 then, when switch 306 is opened the motors will not fire when in alignment with position 206 and the thrust of the motors at position 206' will tend to move the nose of the vehicle laterally to the right of its flight plane, likewise when switch 308 is opened the nose of the vehicle will move to the left of its flight plane and when either switch 307 or 309 is opened the motors will not fire when in alignment with positions 207 or 207' on the axis 68 of the control unit 57 and the nose of the vehicle will move upwardly or downwardly in its flight plane accordingly. When the vehicle attains orbital speed switches 306–309 are opened so that the motors will not fire and continue to propel the vehicle; the switches can then be employed to orient the vehicle by selectively closing any of the switches as described in connection with the single motor 67 of FIG. 5. When it is not necessary to continue rotation of the vehicle it can be stopped by reversing the thrust of jets like 83 (FIG. 14). The pilot would prepare for orientation by aligning axis 65 of the control unit 57 with the horizon, he would start rotor 57' spinning by closing switch 319, he would then start his vehicle slowly rotating with jets like 83 and then selectively operate switches 306–309 and orient his vehicle; these maneuvers will require very little time hence precession of the control unit due to bearing friction on shafts 60, 74 will be substantially nil; if the motors 67 are to be operated for a long period or the vehicle rotated at high speeds, then means like journaling the shaft 60 in an electric motor, as previously described, can be employed. To propel his vehicle the pilot will close all of the switches 306–309 so that the motors 67 will fire each time they are aligned with axes 65, 68.

With a continuous thrust from the motors 67 supplied through a separate fuel injection system and with switches 306–309 normally open the closing of switch 306 will operate the injector 55 of each motor for its fuel charge to fire when each of the motors are substantially aligned with position 206 on the axis 65 of the control unit 57 and the nose of the vehicle will move laterally to the left of the vehicle's flight plane due to the increased thrust of the motors at position 206; accordingly the nose of the vehicle will move to the right when switch 308 is closed and upwardly or downwardly when switches 307 or 309 are closed.

The firing of the motors is advanced or retarded relative to the rotational speed of the vehicle by moving the contacts 201–204 so that the motor thrusts will occur when in substantial alignment with positions 206, 207, 206', 207' on the axes 65, 68 of the control unit, the movement being accomplished automatically with conventional means (similar to advancing or retarding the spark of a gas engine).

The electrical control systems described provide for selectively making changes in the course of a space vehicle, in both atmospheric and planetary flight, by adding to or subtracting from the thrust forces used to steer, orient and propel the vehicle.

In FIG. 7 the vehicle is diagramed as propelled by a motor 400 at its base and steered and oriented by a single rearwardly directed motor as illustrated in FIGS. 5, 12. The motor 67 could be mounted to provide a lateral thrust if this was desired.

In FIG. 8 the vehicle is diagramed as propelled, steered and oriented by two rearwardly directed motors 67 as illutrated in FIGS. 6, 13. The vehicle is also shown propelled by a motor 401 at its base.

The motors 400, 401 can be gimbal mounted for guidance of the vehicle during the auto-pilot phase of flight if the vehicle is launched stationary (non-rotating) and then the vehicle can be rotated with the jets 83 (FIG. 14) with the motors 67 taking over for the guidance phase of flight.

When a plurality of guidance motors 67 are employed they can contribute to lift-off thrust and also serve as upper stage propulsion-guidance in multi-stage vehicles.

The vehicle diagramed in FIG. 9 is in free flight in orbit O and moving in the direction indicated by the arrow. In position A the orbit of the vehicle can be increased by closing all of the switches 306–309, from a normally open position, so that the thrust of the motors 67 at points 206, 207, 206', 207' will tend to increase the speed of the vehicle and thus serve to increase the size of its orbit. To decrease the size of the vehicle's orbit only switch 306 or 308 is closed so that the motors will fire only at points 206 or 206', causing the vehicle to rotate about its center of gravity and orient in a reversed attitude, as diagramed as position B, with the vehicle's thrust axis 54 aligned tangent to the vehicle's orbit; the remaining switches can then be closed so that the motors 67 will fire at all of the positions 206, 207, 206', 207' and the thrust of the motors will tend to reduce the speed of the vehicle and thus serve to reduce the size of its orbit. If the switches are all closed when the vehicle is oriented at a right-angle to its orbit, as diagramed at position C, then the thrust of the motors at positions 206, 207, 206', 207' will serve to change the plane of the vehicle's orbit. Thus the shape of the vehicle's orbit can be changed and, the plane of its orbit changed with a pair of rotated thrust elements whose functioning can be manually controlled by a human pilot or a guidance system in the vehicle, or by command from Earth, and the same motors and controls will also serve to steer the vehicle in atmospheric flight. A single motor 67 functioning as in FIGS. 5, 12 will serve to orient the vehicle in any desired attitude.

In FIGS. 10 and 11, 51' represents the outer wall of a non-rotating space vehicle 50' which can be stabilized against rotating by fins 82 (as illustrated in FIG. 14) when in atmospheric flight or by the jets 83 when in orbit; or by roll, pitch and yaw gyros if desired. Bulkheads 78 are secured to a tubular shaft 79 which is concentric with the thrust, flight and longitudinal axis 54' of the vehicle. A rotatable section 80, supporting two motors 67, is journaled on shaft 79 and is held between collars 58', 81 which are secured to the shaft 79.

Contacts 201–204 are mounted on the collar 58' in the same manner as like contacts are mounted on the frame 58 of FIGS. 3, 4 and brushes 304 are mounted on section 80 in the same manner as the like brushes are mounted on the bulkhead 77 of FIGS. 3, 4; the contacts, collar 58' and the brushes comprising a control unit for this type of space vehicle as the like components comprise the control unit 57 of the spin stabilized vehicle illustrated in FIGS. 3, 4. Collar 81 also serves as a slip ring for brush 320 to connect the solenoid coils 21b with the source of power 300.

Section 80 can be rotated with a jet 84 (FIG. 14), or with inclined vanes when in atmospheric flight, or the motors 67 can be inclined so that their rearward thrust will also serve to rotate section 80; when several motors are employed only some of them need be inclined for this purpose. The vehicle's environment and mission will determine the means for rotation, vanes in atmospheric flight and peripherial jets or inclined motors in all environments.

FIGS. 12, 13 illustrate electrical control systems for selectively controlling a single motor and a pair of motors 67 of rotatable section 80. The components illustrated are identical with those of FIGS. 5, 6 with the exception that the switches 306–309 are connected directly to wire 303 and the solenoid coil 21b is connected to wire 301 through brush 320 and collar 81.

The switches 306–309 are located in the pilot and instrument compartment P of the vehicle for the same purposes as described in their connection with FIGS. 3, 4. The compartment P can be located forward or aft of the bulkheads 78, FIG. 10.

*Operation*

With section 80 rotating clockwise about axis 54' the switches 306–309 can be used in the same manner as they are used in connection with FIGS. 5–9 for steering the vehicle in atmospheric flight and orienting the vehicle, changing the shape of its orbit and changing its orbital plane when in planetary flight.

In flight the lateral axis 65' of the vehicle is maintained aligned with the horizon and the vertical axis 68' of the vehicle will be maintained aligned in a plane coincident with the thrust axis 54' of the vehicle and perpendicular to the horizon, as is the vertical axis 68 of control unit 57 of FIGS. 3–6.

The control unit 57 can be reduced in size so as to be smaller than an automobile engine distributor and in this event other means, such as a gyro stabilizing system similar to control unit 57 of FIGS. 3–6 will have to be provided to prevent precess of the pilot and instrument compartment of FIG. 3 about axis 54.

The switches 306–309 of both vehicles can be controlled by a "joy stick" to assist the pilot before entering and after leaving orbit.

It is not to be construed that my invention is to be limited to controlling only the injectors of Patent 2,798,- 769 as any type of fuel control mechanism subject to electronic direction can be controlled by my invention. Also my invention can be utilized for controlling any character of means for varying the thrust of a space vehicle's propulsion system within the scope of my claims.

Attention is directed to the fact that my invention discloses two distinct types of space vehicles each controlled in both atmospheric and planetary flight by a single control apparatus which differs for each type of vehicle but is alike in the method of operation; each control apparatus selectively controls thrust elements which rotate about the control apparatus and the thrust axis of the vehicle.

In planetary flight it may be desirable to align axes 65, 65' with some other navigational aid than the horizon, this can be done without affecting the structural or operating principles heretofore disclosed.

Only four contacts 201–204 have been illustrated and positioned on the axes 65, 65' and 68, 68' respectively of the vehicles illustrated in FIGS. 3–6 and 10–13, this has been done for the purpose of simplifying the drawings but it is to be understood that other contacts can be positioned on other axes for the control of the motors 67 when they are aligned with these axes for the purpose of guiding, orienting and propelling their respective vehicles relative to such axes; also the contacts 201–204 need not be limited to being positioned on said axes as they can be components of control units positioned any place in the vehicle and regulated to control the motors 67 when the motors are aligned with said axes.

I have elected to employ a pilot to operate my guidance system which, like other inertial guidance systems is integrally contained in its vehicle and its operation cannot be controlled or interfered with by an outside agency. Only the pilot can operate the manual switches 306–309 and he may do so as determined by his navigating instruments or according to pre-flight instruction, which is the equivalent to pre-flight programing an electronic inertial guidance system.

The drawings illustrate two motors 67 positioned about the vehicles' thrust axes 180 degrees apart but, as illustrated in my parent application Ser. No. 770,984, filed Oct. 31, 1958, four motors 67 positioned 90 degrees apart can be employed and these motors can remain substantially aligned with the horizon and with a plane coincident with the vehicles' thrust axes and perpendicular to the horizon, in which position they will serve to orient their vehicles in the manner described in connection with FIGS. 3–6 and 10–13.

I claim:

1. An apparatus for guiding a space vehicle in atmospheric flight and orienting said vehicle in orbital flight comprising in combination: a plurality of normally non-rotating selectively operable control means radially positioned about the thrust axis of said vehicle for selectively controlling a thrust means when it is substantially aligned with the horizon or with a plane coincident with said axis and perpendicular to the horizon; and means for rotating said thrust means about said control means and said axis.

2. An apparatus for guiding a space vehicle in atmospheric flight and orienting said vehicle in orbital flight comprising in combination: a plurality of normally non-rotating selectively operable control means radially positioned about the thrust axis of said vehicle for seletively controlling a thrust means when it is substantially aligned with a control means; and means for rotating said thrust means about said control means and said axis.

3. An apparatus for guiding and propelling a space vehicle in atmospheric flight and orienting and propelling said vehicle in orbital flight comprising in combination: a plurality normally non-rotating selectively operable control means radially positioned about the thrust axis of said vehicle for selectively controlling a plurality of rearwardly directed thrust means when each of them is substantially aligned with the horizon or with a plane coincident with said axis and perpendicular to the horizon; and means for rotating said thrust means about said control means and said axis.

4. An apparatus for guiding and propelling a space vehicle in atmospheric flight and orienting and propelling said vehicle in orbital flight comprising in combination: a plurality of normally non-rotating selectively operable control means radially positioned about the thrust axis of said vehicle for selectively controlling a plurality of rearwardly directed thrust means when they are substantially aligned with a control means; and means for rotating said thrust means about said control means and said axis.

5. An apparatus for guiding a spin stabilized space vehicle in atmospheric flight and orienting said vehicle in orbital flight comprising in combination: a plurality of normally non-rotating selectively operable control means radially positioned about the thrust axis of said vehicle for selectively controlling a thrust means when it is substantially aligned with the horizon or with a plane coincident with said axis and perpendicular to the horizon, said thrust means spinning with said vehicle about said control means and said axis.

6. An apparatus for guiding a spin stabilized space vehicle in atmospheric flight and orienting said vehicle in orbital flight comprising in combination: a plurality of normally non-rotating selectively operable control means radially positioned about the thrust axis of said vehicle for selectively controlling a thrust means when it is substantially aligned with a control means, said thrust means spinning with said vehicle about said control means and said axis.

7. An apparatus for guiding and propelling a spin stabilized space vehicle in atmospheric flight and orienting and propelling said vehicle in orbital flight comprising in combination: a plurality of normally non-rotating selectively operable control means radially positioned about the thrust axis of said vehicle for selectively controlling a plurality of rearwardly directed thrust means when each of them is substantially aligned with the horizon or with a plane coincident with said axis and perpendicular to the horizon, said thrust means spinning with said vehicle about said control means and said axis.

8. An apparatus for guiding and propelling a spin stabilized space vehicle in atmospheric flight and orienting and propelling said vehicle in orbital flight comprising in combination: a plurality of normally non-rotating selectively operable control means radially positioned about the thrust axis of said vehicle for selectively controlling a plurality of rearwardly directed thrust means when they are substantially aligned with a control means, said thrust means spinning with said vehicle about said control means and said axis.

9. An apparatus for guiding a stabilized space vehicle in atmospheric flight and orienting said vehicle in orbital flight comprising in combination: a plurality of normally non-rotating selectively operable control means radially positioned about the thrust axis of said vehicle for selectively controlling a thrust means when it is substantially aligned with the horizon or with a plane coincident with said axis and perpendicular to the horizon; means for rotating said thrust means about said control means and said axis; and means for stabilizing said vehicle.

10. An apparatus for guiding a stabilized space vehicle in atmospheric flight and orienting said vehicle in orbital flight comprising in combination: a plurality of normally non-rotating selectively operable control means radially positioned about the thrust axis of said vehicle for selectively controlling a thrust means when it is substantially aligned with a control means; means for rotating said thrust means about said control means and said axis; and means for stabilizing said vehicle.

11. An apparatus for guiding and propelling a stabilized space vehicle in atmospheric flight and orienting and propelling said vehicle in orbital flight comprising in combination: a plurality of normally non-rotating selectively operable control means radially positioned about the thrust axis of said vehicle for selectively controlling a plurality of rearwardly directed thrust means when each of them is substantially aligned with the horizon or with a plane coincident with said axis and perpendicular to the horizon; means for rotating said thrust means about said control means and said axis; and means for stabilizing said vehicle.

12. An apparatus for guiding and propelling a stabilized space vehicle in atmospheric flight and orienting and propelling said vehicle in orbital flight comprising in combination: a plurality of normally non-rotating selectively operable control means radially positioned about the thrust axis of said vehicle for selectively controlling a plurality of rearwardly directed thrust means when they are substantially aligned with a control means; means for rotating said thrust means about said control means and said axis; and means for stabilizing said vehicle.

13. The method of guiding a space vehicle in atmospheric flight and orienting said vehicle in orbital flight comprising: rotating a thrust element about a normally non-rotating control unit and the thrust axis of said vehicle and then selectively controlling said thrust element when it is substantially aligned with the horizon or with a plane coincident with said axis and perpendicular to the horizon.

14. The method of guiding a space vehicle in atmospheric flight and orienting said vehicle in orbital flight comprising: rotating a thrust element about a plurality of control elements and the thrust axis of said vehicle and then selectively controlling said thrust element when it is substantially aligned with a control element.

15. The method of guiding and propelling a space vehicle in atmospheric flight and orienting and propelling said vehicle in orbital flight comprising: rotating a plurality of rearwardly directed thrust elements about a normally non-rotating control unit and the thrust axis of said vehicle then selectively controlling said thrust elements when each of them is substantially aligned with the horizon or a plane coincident with said axis and perpendicular to the horizon.

16. The method of guiding and propelling a space vehicle in atmospheric flight and orienting and propelling said vehicle in orbital flight comprising: rotating a plurality of rearwardly directed thrust elements about a plurality of control elements and the thrust axis of said vehicle and then selectively controlling said thrust elements when they are substantially aligned with a control element.

17. An integrally contained guidance system for guiding a space vehicle in atmospheric flight and orienting said vehicle in orbital flight comprising in combination: a thrust means rotatable about the thrust axis of said vehicle; means for rotating said thrust means about said axis; and selectively operable control means for controlling said thrust means when it is substantially aligned with the horizon or with a plane coincident with said axis and perpendicular to the horizon.

18. An integrally contained guidance system for guiding and propelling a space vehicle in atmospheric flight and orienting and propelling said vehicle in orbital flight comprising in combination: a plurality of rearwardly directed thrust means rotatable about the thrust axis of said vehicle; means for rotating said thrust means about said axis; and selectively operable control means for controlling said thrust means when each of them is substantially aligned with the horizon or with a plane coincident with said axis and perpendicular to the horizon.

19. The method of operating an integrally contained guidance system to guide a space vehicle in atmospheric flight and orient said vehicle in orbital flight comprising: rotating a thrust element about the thrust axis of said vehicle and then selectively controlling the thrust of said element when it is substantially aligned with the horizon or with a plane coincident with said axis and perpendicular to the horizon.

20. The method of operating an integrally contained guidance system to guide and propel a space vehicle in atmospheric flight and orient and propel said vehicle in orbital flight comprising: rotating a plurality of rearwardly directed thrust elements about the thrust axis of said vehicle and then selectively controlling the thrust of said elements when they are substantially aligned with the horizon or with a plane coincident with said axis and perpendicular to the horizon.

21. The method of increasing the orbit of a space vehicle having an integrally contained guidance system for orienting said vehicle, said system including a thrust means rotatable about the thrust axis of said vehicle and selectively operable to orient said vehicle when said thrust means is substantially aligned with the horizon or with the plane coincident with said axis and perpendicular to the horizon comprising: orienting said vehicle with said thrust axis tangent to said vehicle's orbit and coincident with said vehicle's orbital plane; and then applying a rearwardly directed thrust force coincident with said axis to increase the speed of said vehicle.

22. The method of decreasing the orbit of a space vehicle having an integrally contained guidance system for orienting said vehicle, said system including a thrust means rotatable about the thrust axis of said vehicle and selectively operable to orient said vehicle when said thrust means is substantially aligned with the horizon or with the plane coincident with said axis and perpendicular to the horizon comprising: orienting said vehicle with said thrust axis tangent to said vehicle's orbit and coincident with said vehicle's orbital plane; and then applying a forwardly directed thrust force coincident with said axis to decrease the speed of said vehicle.

23. The method of changing the orbital plane of a space vehicle having an integrally contained guidance system for orienting said vehicle, said system including a thrust means rotatable about the thrust axis of said vehicle and selectively operable to orient said vehicle when said thrust means is substantially aligned with the horizon or with the plane coincident with said axis and perpendicular to the horizon comprising: orienting said vehicle with said thrust axis at an angle to said vehicle's orbital plane and then applying a thrust force coincident with said axis.

24. An integrally contained guidance system for guiding a spin stabilized space vehicle in atmospheric flight and orienting said vehicle in orbital flight comprising in combination: a thrust means rotatable with said vehicle about its thrust axis; means for rotating said vehicle about said axis; and selectively operable control means for controlling said thrust means when it is substantially aligned with the horizon or with a plane coincident with said axis and perpendicular to the horizon.

25. An integrally contained guidance system for guiding and propelling a spin stabilized space vehicle in atmospheric flight and orienting and propelling said vehicle in orbital flight comprising in combination: a plurality of rearwardly directed thrust means rotatable with said vehicle about its thrust axis; means for rotating said vehicle about said axis; and selectively operable control means for controlling said thrust means when each of them is substantially aligned with the horizon or with a plane coincident with said axis and perpendicular to the horizon.

26. An integrally contained guidance system for guiding a stabilized space vehicle in atmospheric flight and orienting said vehicle in orbital flight comprising in combination: a thrust means rotatable about the thrust axis of said vehicle; means for rotating said thrust means about said axis; selectively operable control means for controlling said thrust means when it is substantially aligned with the horizon or with a plane coincident with said axis and perpendicular to the horizon; and means for stabilizing said vehicle.

27. An integrally contained guidance system for guiding and propelling a stabilized space vehicle in atmospheric flight and orienting and propelling said vehicle in orbital flight comprising in combination: a plurality of rearwardly directed thrust means rotatable about the thrust axis of said vehicle; means for rotating said thrust means about said axis; selectively operable control means for controlling said thrust means when each of them is substantially aligned with the horizon or with a plane coincident with said axis and perpendicular to the horizon; and means for stabilizing said vehicle.

References Cited

UNITED STATES PATENTS

| | | | |
|---|---|---|---|
| 2,415,348 | 2/1947 | Haigney | 102—50 |
| 2,552,359 | 5/1951 | Winslow | 244—52 |
| 2,798,769 | 7/1957 | Whitson | 239—5 |
| 2,822,755 | 2/1958 | Edwards et al. | 102—50 |
| 2,849,995 | 9/1958 | Smathers | 102—49 |
| 2,850,251 | 9/1958 | Joerndt | 244—14 |
| 2,852,208 | 9/1958 | Schlesman | 244—14 |
| 2,941,764 | 6/1960 | Lee et al. | 244—1 |
| 3,072,365 | 1/1963 | Linscott et al. | 244—14 |

FERGUS S. MIDDLETON, *Primary Examiner.*